United States Patent [19]
Sjötun

[11] Patent Number: 6,158,476
[45] Date of Patent: Dec. 12, 2000

[54] TUNE OR HOSE CAPABLE OF WITHSTANDING EXTREME HEAT FLUX DENSITIES

[75] Inventor: Kyrre Sjötun, Kongsberg, Norway

[73] Assignee: Trelleborg Viking AS, Norway

[21] Appl. No.: 09/269,550

[22] PCT Filed: Aug. 28, 1998

[86] PCT No.: PCT/SE98/01530

§ 371 Date: Mar. 30, 1999

§ 102(e) Date: Mar. 30, 1999

[87] PCT Pub. No.: WO99/11962

PCT Pub. Date: Mar. 11, 1999

[30] Foreign Application Priority Data

Aug. 29, 1997 [SE] Sweden ................................ 9703110

[51] Int. Cl.[7] .................................................. F16L 11/10
[52] U.S. Cl. .......................... 138/126; 138/124; 138/127; 169/56; 169/16; 169/19; 222/54
[58] Field of Search ..................... 138/123, 124, 138/125, 126, 127; 222/54; 169/16, 17, 18, 19, 56, 57, 58

[56] References Cited

U.S. PATENT DOCUMENTS

| | | | |
|---|---|---|---|
| 3,422,854 | 1/1969 | Brinson et al. | |
| 3,858,618 | 1/1975 | Kaufman | 138/124 |
| 3,886,980 | 6/1975 | Elson | 138/127 |
| 4,137,949 | 2/1979 | Linko, III et al. | 138/125 |
| 4,159,027 | 6/1979 | Caillet | 138/127 |
| 4,357,962 | 11/1982 | Shaw et al. | 138/124 |
| 4,420,018 | 12/1983 | Brown, Jr. | 138/124 |
| 4,427,033 | 1/1984 | Ege | 138/127 |
| 4,452,279 | 6/1984 | Atwell | 138/126 |
| 4,553,568 | 11/1985 | Piccoli et al. | 138/125 |
| 5,176,660 | 1/1993 | Truckai | 138/129 |
| 5,803,129 | 9/1998 | Coronado et al. | 138/125 |

FOREIGN PATENT DOCUMENTS

| | | |
|---|---|---|
| 1962070 | 6/1971 | Germany . |
| 2348401 | 11/1977 | Germany . |
| 319050 | 12/1969 | Sweden . |

*Primary Examiner*—James Hook
*Attorney, Agent, or Firm*—Burns, Doane, Swecker, & Mathis, L.L.P.

[57] ABSTRACT

A pipe or hose (10) intended primarily for fire protection purposes and capable of withstanding high heat flux densities. The pipe or the hose has an internal, tubular rubber layer (11) and a casing (12) provided with holes which casing embraces the tubular rubber layer (11) in close contact therewith. The holes in the casing (12) are situated close together and have a limited cross-sectional area such that liquid transported in the pipe or hose (10) at a current liquid pressure above atmospheric pressure and through the medium of a nozzle effect in direct contact with the casing (12) and, subsequent to release from said casing contact, is able to form a free-standing liquid jet. When used in sprinkler systems or like fire extinguishing systems, the pipe or the hose will be imparted herewith self-sealing and self-protecting properties, and will withstand a heat flux density caused by a jet fire of up to about 500 kW/m$^2$ while essentially maintaining liquid pressure and liquid flow in said pipe continuously during the extinguishing process.

15 Claims, 1 Drawing Sheet

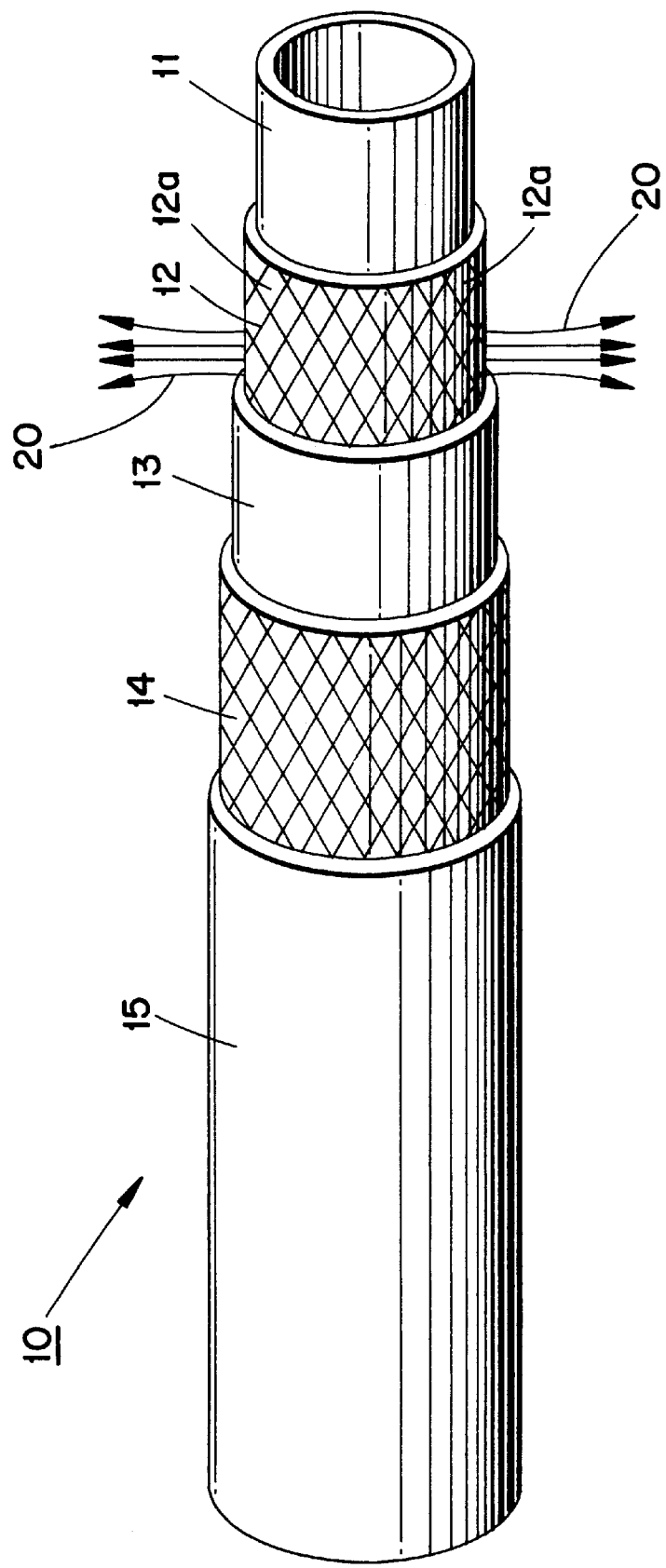

TUNE OR HOSE CAPABLE OF WITHSTANDING EXTREME HEAT FLUX DENSITIES

The invention relates to a pipe or a hose, primarily for fire protection purposes, that can withstand extreme heat flux densities.

In the case of fire, different high heat flux densities occur together with high temperatures, depending on the nature of the fire. In the case of a difficult fire that involves the combustion of solid fuels, so-called cellulosic fire, the temperature in the region of the fire increases continuously and will be about 900° C. after 60 minutes, about 1050° C. after 120 minutes and a highest temperature of about 1150° C. will be reached after 240 minutes. The heat flux density that prevails at the same time is, on average, about 60 kW/m$^2$, and a maximum heat flux density of about 100 kW/m$^2$ can be reached. In hydrocarbon pool fires or the like, the temperature rises much more rapidly and a maximum temperature of about 1150° C. will be reached after 20 minutes. The heat flux density is much higher than in the case of cellulose fires, on average about 200 kW/m$^2$, with a highest peak of about 225 kW/m$^2$. The worst type of fire is the so-called jet fire, which may occur when natural gas and different condensates burn under high pressure, such as in natural gas reservoirs, either offshore or on land. Offshore platforms and corresponding installations on land can be the subject of such fires and such fires have, unfortunately, occurred with catastrophic consequences and the loss of many lives. In the case of jet fires, the temperature rises very quickly (10–15 seconds) to a magnitude of 1300–1400° C., at which the fire has a typical heat flux density of 360 kW/m$^2$ which is limited up to about 500 kW/m$^2$.

Against this background, the recovery of oil and gas offshore and on land places very high demands on fire safety and fire protection, and offshore platforms are thus equipped with advanced sprinkler systems based on pumping large volumes of water from the sea, said systems having branches in all parts of the platforms. Present-day traditional sprinkler systems are often constructed from different steel qualities, although trial have been run with other, more corrosion-resistant materials, such as high-alloy acid-proof steel of type SMO, or expensive metals such as titanium and alloys of Cu-Ni, because of corrosion problems caused by aggressive sea water due to its high salt content.

All metallic materials that can be used in practice, however, have limited corrosion resistance. Furthermore, such metallic materials and alloys are also extremely expensive, primarily because the raw material prices for said metals or said alloy components are high. Because the costs of producing and assembling components made from such materials is also high, a different material that also has greater resistance to corrosion is highly desired.

Various plastic materials, such as fibreglass reinforced epoxy resins, have achieved a certain amount of use in a number of pipe systems in the oil and gas industry, for instance on offshore platforms and in similar environments. Although plastic pipes are, in themselves, competitive from the cost aspect, they need to be treated and handled very carefully and very accurately when being installed, and require comprehensive fire insulation even for the simplest use in offshore installations and in similar fields. This results, instead, in very high installation, servicing and maintenance costs. Naturally, the resistance of these materials to jet fires also varies greatly, although it can be said generally that the greater the resistance to jet fires the more comprehensive the additional protective measures that must be made, with an associated weight increase and higher costs for the pipe systems.

One requirement of a sprinkler system or any other pipe system intended for fire protection purposes is that it is capable of transporting the liquid to be distributed to the site or sites of a fire while maintaining the pressure and volume generated by the pumps at least substantially. This function enables the sprinkler system to operate in the manner intended and to distribute liquid through nozzles installed in the sprinkler system, for extinguishing fires and also to prevent spreading of such fires. The pipe system of a sprinkler system must therefore be tightly sealed, or at least essentially tightly sealed, so as to be able to maintain the requisite pressure in the pipes leading to all sprinkler nozzles, including the most peripheral parts of the pipe system, even when exposed to a jet fire during the whole of the fire extinguishing process.

In conjunction with work carried out with the intention of developing flexible, corrosion-resistant pipes based on reinforced rubber and capable of replacing metal and plastic pipes as corrosion-resistant pipes for the offshore industry, as described in our co-terminus Patent Application SE-A-9703109-0 with the title "Corrosion- and Fire-Resistant Pipe Systems", trials were run with the use of a so-called metal cloth flame shield. During this development work, it was found surprisingly that when testing in a so-called jet-fire rig it was possible to produce a self-sealing and actually even a self-protecting pipe and therewith make the function of the pipe as a distributor of liquid under pressure principally insensitive to the effect of the extremely high heat flux densities of a jet fire.

It was also found that this earlier unknown or undescribed phenomena were related to certain constructive features of the inner reinforcement layer that was required in order to impart to the combination of rubber layers and reinforcement layers the flexural rigidity needed to provide a product that has the properties and qualities of a pipe, possibly together with one or more further reinforcement layers. It was also found that these constructive features had a general function and thus imparted said self-sealing and the self-protecting properties to a pipe or a hose that had been built-up with this material combination, irrespective of how the latter was combined with other layers disposed outside this combination, and that the invention can thus be used to produce pipes and hoses that can be used in fire protection systems or for other fire protection purposes.

The object of the invention is thus to provide a pipe or a hose, preferably for fire protection purposes, that is able to withstand a heat flux density as high as that which prevails in a so-called jet fire such as to maintain the function of the pipe or hose to transport fire extinguishing liquid, in normal cases sea water, to the site of the fire over an essentially unlimited period of time or at least for a sufficient period of time to enable the fire to be extinguished.

To this end, the inventive pipes or hoses are characterised in that they include an internal, tubular rubber layer and a perforated casing that is in embracing contact with said rubber layer. The perforations in the casing are placed close together and have a limited cross-sectional area such that liquid transported in the pipe or the hose at a pressure above atmospheric pressure is in direct contact with the casing and will form a continuous, coherent and free-standing jet subsequent to being released through some form of nozzle action. When sprinkler pipes or the like are used to extinguish fires, the pipe or the hose is imparted self-sealing and self-protecting properties and thus counteracts a heat flux density generated by a jet fire, signifying a heat flux density of up to about 500 kW/m², while maintaining pressure and flow in said pipe or hose essentially continually during the whole of the extinguishing process.

The casing is preferably comprised of an effective heat-conducting metal material, preferably a heat-resistant steel, or a heat-resistant composite material, preferably a carbon-fibre based material, such as a Kevlar type material. The casing may have the form of a net, although other techniques of providing the necessary holes can be employed, and the casing may thus be a knitted, a wound, a braided or crocheted structure. The perforated casing may also consist of a single hose-shaped unit which has been provided with holes mechanically or in which the holes have been formed in manufacture of the hose, for instance by injection moulding or the like.

The inventive pipes or hoses find their primary use in sprinkler systems and also generally in pipe systems in offshore installations or in mine installations, and similar fields, where high requirements are placed on corrosion and impact resistance, useful length of life, and difficult installation conditions.

The self-sealing and self-protecting functions or properties of the aforedescribed pipe or hose are closely connected with the combination of an internal rubber layer and a perforated casing disposed on said layer. By "self-sealing and self-protecting" is meant that when said pipe or said hose is subjected to the heat of jet fires or to correspondingly high temperatures, all holes that are formed in the walls of the pipe or hose by external environmental influences will self-seal successively and therewith temporarily protect themselves by virtue of the water jets that will then issue from the holes and therewith locally "fight" the fire and subdue the temperature for as long as it takes for the hole thus formed to close. The mechanism behind this phenomenon will be discussed in more detail below, to the extent that it has been understood or theoretically explained. The combination of materials in question can be included in different types of hoses and pipes, and it is not particularly critical in this respect which further layers are applied outside the layers in the pipe or the hose, since these are not required to be jet-fire resistant, but can be chosen to impart other predetermined properties to the pipe or hose. It is assumed that the outer layers will be burned-off relatively quickly at jet-fire temperatures.

In the case of sprinkler pipes, for instance used on oil platforms, the pipes may be the corrosion resistant pipes that are the subject of our earlier mentioned, co-terminus Patent Application. The inner reinforcement layer of such pipes may then be provided with holes in accordance with the present invention and therewith form the casing included in the concept of this invention. However, the casing may alternatively be produced in some other way within the scope of this invention, and the necessary bending-resistant function achieved by one or more separate reinforcement layers, these separate reinforcement layers not needing to present holes that have a "nozzle function".

The mechanism of the self-sealing and self-protecting function is connected with a phenomenon that has not yet been fully investigated or theoretically explained. However, the behaviour has been documented through intensive trials run in a so-called "jet-fire rig" in Trelleborg Viking's plant in Mjöndalen, Norway, on video tape among other things. This has enabled trials to be repeatedly followed-up.

It has been found that when a pipe that has a self-sealing function within the meaning of the inventive concept is subjected to a jet fire while liquid under pressure flows through the pipe, the outer rubber layers and reinforcement layers of the pipe will burn-off relatively quickly and therewith expose the perforated casing. When the rubber layer that lies inwardly of the casing begins to melt away in patches due to the powerful, locally limited peaks in the heat flux density occurring in the jet fire (up to about 500 kW/m²), holes will appear in the inner rubber layer and a jet of liquid begins to grow and spray out through the perforations in the casing and onto the jet fire, therewith drastically reducing the flame temperature. After a short period of time, normally between 10–20 seconds and up to 1–2 minutes, however, the thus formed holes will be sealed by the inwardly lying and adjacent material that is not cooled, and the jets of liquid will begin to taper off and finally cease.

This phenomenon continues for a long period of time under the influence of the jet fire and long-term trials have shown that the water pressure in the pipe does not fall to any registerable extent. Consequently, no pressure drop would have occurred in the sprinkler nozzles with a subsequent short fall of fire extinguishing liquid if the pipes had formed part of a sprinkler system. In other words, during the whole of the process, the pipe functions fully satisfactorily as a conduit for transporting water or other fire extinguishing liquid continuously in the absence of any essential drops in pressure or liquid short falls that may have an inhibiting function on the fire extinguishing process. Thus, the liquid that flows from the nozzle-like holes in the pipe or hose onto the flames contributes in both cooling the pipe and hose locally and in greatly reducing flame temperature in the area concerned.

Some theories regarding the self-sealing and self-protecting function may, nevertheless, be worthy of mention and also of interest in the present context. Thus, it is possible that the internal rubber layer obtains a consistency in which it is pressed out by the pressure of the liquid against the region where a hole is formed and where the liquid jet exits, this jet of water also cooling the material in this region until the rubber mass is pressed into the hole and therewith stops the powerful liquid jet. If the holes have become too large to generate a nozzle effect and therewith a powerful jet, the liquid would have quietly run through the holes formed in the rubber layer without having the pressure and speed to "spray away" the jet flame. This would mean that no cooling effect sufficient to solidify the rubber layer in the vicinity would be obtained, and that holes formed in the rubber layer would begin to grow rapidly and in an uncontrolled fashion instead of shrinking, and gradually cause increasing destruction of the layer, wherewith the pressure and liquid transport would quickly cease.

The invention will now be described with reference to a preferred embodiment thereof and also with reference to the accompanying drawing, the single FIGURE of which is a perspective view of a pipe from which the various layers have been partially cut away.

Shown in the FIGURE is a pipe 10 intended for an oil platform sprinkler system, in accordance with the invention. The pipe 10 has five different sub-layers 11–15. The innermost layer 11 is comprised of rubber and suitably has a thickness of 3–5 mm and consists of chloroprene rubber, EPDM rubber, or some similar rubber. This layer is embraced by a casing 12 that includes closely adjacent holes 12a disposed over the whole of its surface. The cross-section of the holes 12a is chosen in relation to liquid pressure, dimensions and fire safety requirements for which the pipe is adapted. For instance, the holes 12a may have a size of 0.1–10 mm at a liquid pressure in the region of 1.5–100 bar. The illustrated casing 12 is a metal net, although it may have different forms as earlier mentioned. The perforated casing 12 may also have the function of a reinforcement layer with reinforcing wires arranged at an angle between oppositely directed wires such that the reinforcement layer will have a predetermined bending resistance while, at the same time, providing effective protection against jet fires with the exiting liquid jet 20 or spray having the speed and configuration necessary to cool the flame temperature. Provided outside the perforated casing 12 is a further rubber layer 13 which, with respect to the action of fire, may consist of a particularly insulating and non-combustible rubber, for instance a rubber designated as VIKING NOFLAME 815 or 915. The rubber layer 13 is embraced by a reinforcement layer 14 comprising reinforcement wires that are disposed at such angles to the longitudinal axis of the pipe as to make the pipe resistant to bending or flexurally rigid. The reinforcement layer 14 is embraced by a further rubber layer 15 which is comprised of a rubber material that will give the pipe surface predetermined properties, for instance make the pipe surface fire-resistant, smokeless or non-toxic, and to enhance the insulating effect in the event of fire. The size of the openings in the reinforcement layer is also dependent on liquid pressure, dimensions and fire safety requirements, and may vary between 0.20 and 10 mm$^2$.

What is claimed is:

1. A pipe or hose intended primarily for fire protection purposes and capable of withstanding high heat flux densities, wherein the pipe or hose has an internal, tubular rubber layer and a perforated casing having holes or perforations, which embraces the tubular rubber layer in close contact therewith, the holes or perforations being situated close together and having a limited cross-sectional area such that liquid transported in the pipe or hose at a liquid pressure above an atmospheric pressure forms a free standing liquid jet, wherein when used as a sprinkler pipe for extinguishing fire, the pipe or hose is imparted self-sealing and self-protecting properties and therewith withstands a heat flux density caused by a jet fire while essentially maintaining liquid pressure and liquid flow in said pipe continuously during the extinguishing process, said jet-fire heat flux density having a heat flux density up to about 500 kW/m$^2$.

2. The pipe or hose according to claim 1, wherein the casing is comprised of wires or ribbons that have been wound, braided, knitted or disposed in some other way so as to define angles with each other.

3. A sprinkler system for fire protection comprising a pipe or hose according to claim 2.

4. The pipe or hose according to claim 1, wherein the casing is a single coherent unit having holes that are formed mechanically or in conjunction with the manufacture of the unit.

5. A sprinkler system for fire protection comprising a pipe or hose according to claim 4.

6. A sprinkler system for fire protection comprising a pipe or hose according to claim 1.

7. The sprinkler system according to claim 6 wherein the system is located in an installation selected from the group consisting of an offshore installation, shipyard installation and mine installation.

8. The pipe or hose according to claim 1, wherein the perforated casing is made of metal or a composite material.

9. A sprinkler system for fire protection comprising a pipe or hose according to claim 8.

10. The pipe or hose according to claim 8, wherein the perforated casing is made of heat-resistant steel.

11. The pipe or hose according to claim 8, wherein the perforated casing is made of a carbon-fibre based composite of Kevlar type.

12. The pipe or hose according to claim 8, wherein the perforated casing is comprised of wires or ribbons that have been wound, braided, knitted or disposed in some other way so as to define angles with each other.

13. A sprinkler system for fire protection comprising a pipe or hose according to claim 12.

14. The pipe or hose according to claim 8, wherein the perforated casing is a single coherent unit having holes that are formed mechanically or in conjunction with the manufacture of the unit.

15. A sprinkler system for fire protection comprising a pipe or hose according to claim 14.

* * * * *